United States Patent [19]

Knox et al.

[11] Patent Number: 5,909,210
[45] Date of Patent: Jun. 1, 1999

[54] KEYBOARD-COMPATIBLE OPTICAL DETERMINATION OF OBJECT'S POSITION

[75] Inventors: Richard M. Knox, Houston; John R. Masters, Woodlands; Kevin F. Clancy, Spring, all of Tex.

[73] Assignee: Compaq Computer Corporation, Houston, Tex.

[21] Appl. No.: 08/821,040

[22] Filed: Mar. 20, 1997

Related U.S. Application Data

[63] Continuation of application No. 08/486,310, Jun. 7, 1995.

[51] Int. Cl.$^6$ ..................................... G06F 3/023
[52] U.S. Cl. ........................ 345/168; 345/170; 345/175; 178/18; 250/224; 340/712; 341/31; 356/375
[58] Field of Search ..................................... 345/168, 170, 345/175; 341/31, 20, 21; 178/18; 250/215, 221, 227.21, 227.22, 233, 224; 356/375, 372; 340/712, 709

[56] References Cited

U.S. PATENT DOCUMENTS

| | | | |
|---|---|---|---|
| 4,294,543 | 10/1981 | Apple et al. | 356/375 |
| 4,420,261 | 12/1983 | Barlow et al. | 356/375 |
| 4,553,842 | 11/1985 | Griffin | 356/375 |
| 4,558,313 | 12/1985 | Garwin et al. | 340/709 |
| 4,746,770 | 5/1988 | McAvinney | 178/18 |
| 5,196,835 | 3/1993 | Blue et al. | 340/712 |
| 5,493,112 | 10/1996 | Welch | 250/559.4 |
| 5,565,686 | 2/1996 | Welch | 250/221 |
| 5,734,375 | 3/1998 | Knox et al. | 345/168 |
| 5,786,810 | 7/1998 | Knox et al. | 345/168 |

FOREIGN PATENT DOCUMENTS

| | | |
|---|---|---|
| 2449925 | 1/1979 | France . |
| 2083218 | 8/1980 | United Kingdom . |

OTHER PUBLICATIONS

Patent Abstracts of Japan, vol. 008, No. 068(p. 264), Mar. 30, 1984.

R.L.Garvin: "Scanning Light Spot for Stylus Input to a Computer Through a Tablet" IBM Technical Disclosure Bulletin, vol. 14, No. 10, Mar. 1972, pp. 3031–3032.

*Primary Examiner*—Jeffrey A. Hofsass
*Assistant Examiner*—Davetta Woods
*Attorney, Agent, or Firm*—Robert Groover; Betty Formby

[57] ABSTRACT

A method of determining an object's position and associated apparatus provides positional information in a form that may be conveniently communicated to a computer to calculate the object's position. In a preferred embodiment, representatively incorporated in a computer keyboard, a method of determining an object's position includes forming an optical grid of reflected beacons and detecting an obstruction of the reflected beacons. The preferred embodiment apparatus utilizes a single light source and a single light sensor to detect an object's position in two dimensions.

18 Claims, 4 Drawing Sheets

KEYBOARD-COMPATIBLE OPTICAL DETERMINATION OF OBJECT'S POSITION

This is a continuation of Pending Ser. No. 08/486,310, filed Jun. 7, 1995, now pending.

BACKGROUND OF THE INVENTION

1. Field of the Invention

The present invention relates generally to methods of determining an object's position and, in a preferred embodiment thereof, more particularly provides a method and apparatus for optically digitizing an object's position on a plane above a computer keyboard.

2. Description of Related Art

Pointing devices are well known in the computer art. Their purpose, generally, is to permit the computer user to input positional information to the computer. A pointing device performs this function by "digitizing" an object's relative position in space, that is, by putting the positional information in a form that is readable by the computer.

The number of uses for pointing devices have increased as modern computer user interfaces have become increasingly graphical. For example, a computer user may now use a "mouse" to select a file to open for editing purposes (by "clicking" on an icon representing the file), instead of typing a file name on a keyboard.

Typical pointing devices currently available to computer users include mouse, trackball, digitizing pad, joystick, touch screen, and eye tracking devices. There are variations of each of these and there are pointing devices that have a combination of features found on more than one of these. Each, however, has its disadvantages.

A mouse typically has a housing for grasping in the user's hand, and a ball underneath the housing for rolling the housing about on a desktop. Rollers inside the housing digitize the mouse's position by translating the ball's movement into electrical signals which are then communicated to the computer. Switches, typically mounted to the housing's top surface, allow the user to "click" (activate a switch to select an icon, for example) on an object displayed on the computer's screen, or perform other functions. The mouse, however, requires the user to devote a significant portion of a desktop as an area in which the mouse can be rolled around. The mouse also requires the user to remove one hand from the keyboard while the mouse is being rolled around on the desktop and/or while a mouse switch is being activated, thus slowing down the data entry process. Furthermore, the mouse requires a means of communicating the electrical signals to the computer, such as a cable which must be attached between the computer and the mouse and must follow the mouse around the desktop.

A trackball eliminates some of the mouse's disadvantages, but substitutes others in their place. The trackball is, essentially, an upside-down mouse, having a stationary housing with the ball facing upward so that the ball can be rolled by the user's fingers. The switches are normally placed on the top surface of the housing adjacent the ball. The rollers which translate the ball's motion into electrical signals are located in the housing where, due to the large upward-facing opening in the housing through which the ball protrudes, they are exposed to dust and dirt. Some keyboard manufacturers have eliminated the need for a separate trackball device cable for communicating the electrical signals to the computer by building the trackball device directly into the keyboard housing so that a single cable communicates both keyboard and trackball input to the computer. The user does, however, still have to move his or her hand away from the keyboard in order to roll the ball. Another disadvantage is that a large amount of dexterity is required to manipulate the trackball while clicking on a screen object, if only one hand is used.

A digitizing pad typically utilizes a rectangular planar area on the surface of a hard plastic housing, which, in turn, is placed on the user's desktop. The pad uses one of several methods to sense the position of a pen or stylus on the pad surface. In some pads, the pressure of the pen or stylus on the pad surface makes contact or changes capacitance in many fine, closely spaced conductors beneath the pad's surface. In some others, the pen or stylus carries a magnetic or electromagnetic field source which is sensed by the pad, thus, the pen or stylus position is sensed due to the proximity of the pen or stylus to the pad. Among the digitizing pad's disadvantages is the space on the desktop taken up by the pad's housing. Additionally, the user must remove his or her hand from the keyboard to operate the pen or stylus.

A joystick is another pointing device, and may have either a movable or a non-movable stick. The movable joystick operates similar to a trackball, except that a stick is inserted into the ball giving the user a means of grabbing the ball. The stick also limits movement of the ball. The non-movable joystick utilizes pressure sensors encircling the stick to sense the force and direction in which the user is pushing the stick. Thus, the non-movable joystick does not communicate a position to the computer, instead it senses a force vector which the computer may use to adjust the position of a screen object. As joysticks rely upon a translation of a sensed force vector into a change in cursor position, joystick manipulations are often counterintuitive to computer users. Thus, in comparison with other pointing devices, joysticks have a significant problem in ease of use.

Eyetracking devices use expensive, sophisticated methods of determining where on the computer screen the user's eyes are focuses. In this way the user's hands do not have to leave the keyboard in order for the positional information to be communicated to the computer. Unfortunately, however, this technology is not within financial reach of most computer users.

Touch screens permit the user to communicate a position to the computer by actually touching an area on the computer screen. Usually the screen area is associated with an object or menu choice displayed on the screen. As with all of the aforementioned pointing devices, with the exception of the eyetracking devices, the user's hand must leave the keyboard to use the device.

From the foregoing, it can be seen that it would be quite desirable to provide a method of communicating an object's position to the computer which does not require the removal of either of the user's hands from the keyboard and which may be economically produced. It is accordingly an object of the present invention to provide such a method and associated apparatus.

SUMMARY OF THE INVENTION

In carrying out the principles of the present invention, in accordance with an embodiment thereof, a method is provided which permits the user to communicate positional information to the computer by obstructing a light grid with the user's finger, without removing either of the user's hands from the keyboard. An apparatus is also provided which produces the light grid from a single light source and detects the position of an object obstructing the grid.

In broad terms, a method of sensing an object's position is provided, the method comprising the steps of providing a light source, causing the light source to emit light rays, collimating a portion of the light rays so that the light rays form a light beam having substantially parallel sides, providing a beam splitter, passing the beam through the beam splitter, providing means for producing a beacon from the beam, directing the beam into the beacon producing means thereby producing a beacon, providing means for separating the beacon into at least two portions, passing the beacon through the beacon separating means so that the beacon is separated into first and second beacon portions, providing a first reflecting means for reflecting the first beacon portion back to the beam splitter, directing the first beacon portion to the first reflecting means, providing a second reflecting means for reflecting the second beacon portion back to the beam splitter, directing the second beacon portion to the second reflecting means, and providing light sensing means for sensing light reflecting back to the beam splitter, whereby, if the object obstructs the first or the second beacon portions, the light sensing means will sense a corresponding absence of the light rays reflecting back to the beam splitter, and the position of the object may be calculated.

An optical digitizer is also provided, the optical digitizer comprising a light grid, the light grid comprising first and second beacons, first means for orienting the first beacon in the light grid, second means for orienting the second beacon in the light grid, first means for reflecting the first beacon across the light grid, the first reflecting means being disposed such that the light grid is intermediate the first orienting means and the first reflecting means, second means for reflecting the second beacon across the light grid, the second reflecting means being disposed such that the light grid is intermediate the second orienting means and the second reflecting means, first means for reducing the first beacon to a first linear beam of light after the first beacon has been reflected across the light grid, second means for reducing the second beacon to a second linear beam of light after the second beacon has been reflected across the light grid, and means for detecting an interruption in each of the first and second linear beams of light.

Additionally, a computer keyboard device of the type having a generally planar top surface and a plurality of keys disposed on the top surface, and further having the capability of detecting the position of an object is provided, the computer keyboard comprising reflector means, the reflector means being supported on the keyboard top surface, beacon producing means, the beacon producing means being mounted on the keyboard top surface and being positioned so that a beacon of light is directed to sweep repeatedly across the reflector means to produce a reflected light beacon, and light sensing means for measuring the intensity of light received therein, the light sensing means being positioned to receive the reflected light beacon therein.

The use of the disclosed method and associated apparatus enables positional information to be conveniently and economically communicated to the computer. Use of the computer keyboard device embodiment enables the user's time to be more effectively utilized since the user's hands do not have to leave the keyboard to communicate positional information to the computer.

DETAILED DESCRIPTION

Figure 1:
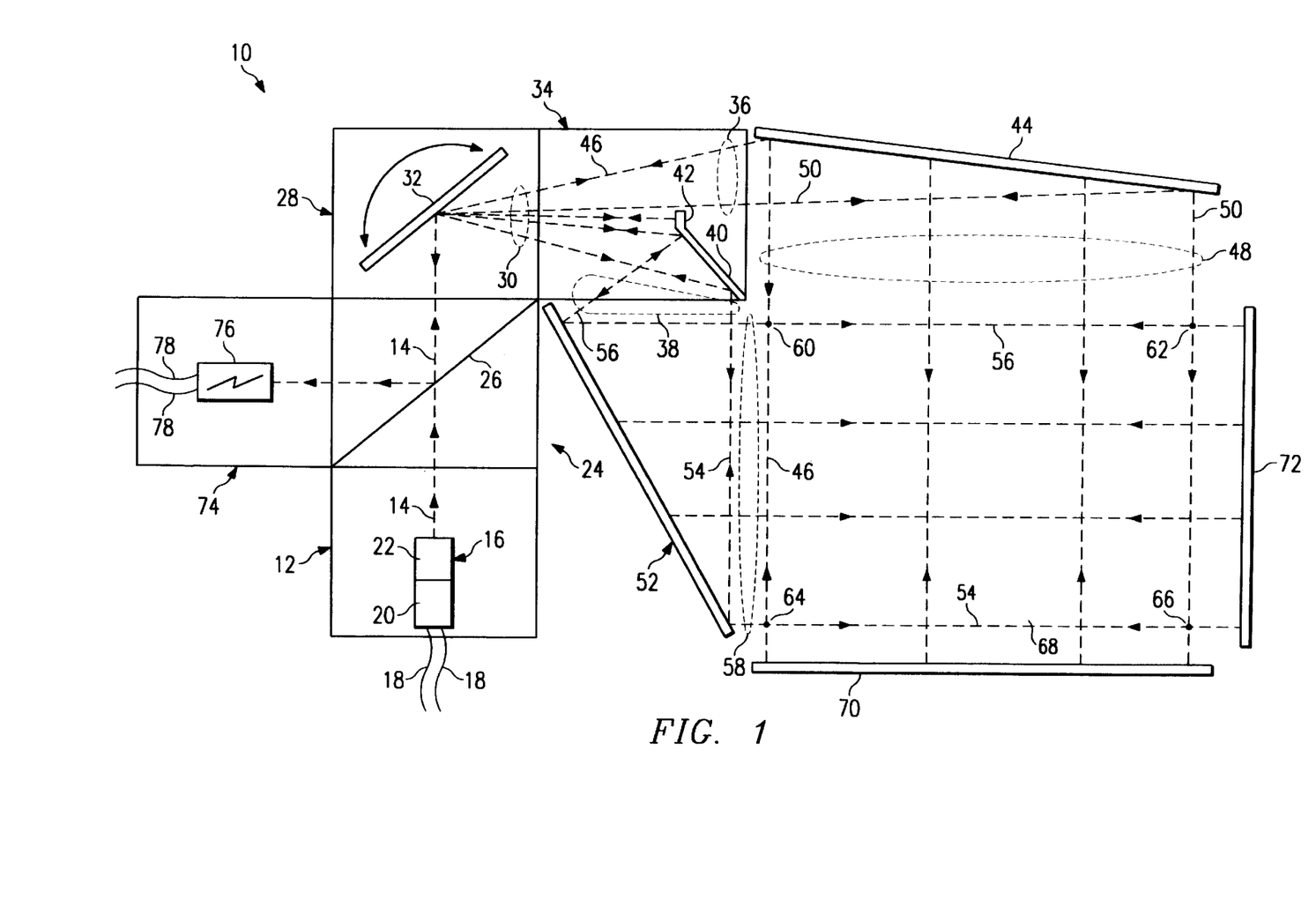
FIG. 1 is a schematic representation of an optical digitizer embodying principles of the present invention.

Illustrated in FIG. 1 is an optical digitizer 10 which embodies principles of the present invention. It is shown in highly schematicized form for the purpose of clarity. Dashed lines and arrows are used to represent paths and directions, respectively, of light. Filled arrowheads represent directions of unreflected light and unfilled arrowheads represent directions of reflected light in a manner that will become apparent as the following detailed description is read and understood.

A light source 12 provides a compact beam of light 14 which is in the infrared portion of the light spectrum in the illustrated preferred embodiment. The light source 12 includes a laser 16 which, in turn, includes a light emitting diode 20 and a collimator 22. The light emitting diode 20 produces infrared light when leads 18 are connected to a power source (not shown). The infrared light produced by the light emitting diode 20 is made into the beam 14 having essentially parallel sides by the collimator 22.

The beam 14 next passes into a beam splitter 24. The beam splitter 24 includes a half-silvered mirror 26 which passes half of the beam 14 and reflects the other half. The reflected half of the beam 14 is not used in the illustrated preferred embodiment, so it is not shown in FIG. 1. Alternately, first and second light sources, respectively positioned to emanate in the directions of the first and second halves of the beams, may be provided in place of the single light source 12 and beam splitter 24.

The beam 14 next passes into a beacon generator 28. The beacon generator 28 produces a beacon 30 from the beam 14 by reflecting the beam 14 off of an oscillating mirror 32. The beacon 30 differs from the beam 14 in that the beacon 30 "sweeps" across a plane, whereas the beam 14 remains stationary. In other words, the beacon 30 is the beam 14 put into motion by the oscillating mirror 32.

It is to be understood that the beacon 30 may be generated from the beam 14 by another method without deviating from the principles of the present invention. For example, instead of the oscillating mirror 32 in the beacon generator 28, a rotating polygonal mirror could be used to repeatedly and sequentially sweep beam 14 across an area. As a further example, beam 14 could be directed across a curved surface instead of a flat plane.

The beacon 30 is directed into a beacon separator 34. In the beacon separator 34, the beacon 30 is separated into several components. One component is (as viewed in FIG. 1) a horizontal component 36. The horizontal component 36 passes through the beacon separator 34 in the illustrated preferred embodiment without any change in direction. Another component, a vertical component 38 (as viewed in FIG. 1), is reflected off of a mirror 40 so that it is directed in a direction different from the horizontal component 36.

In the area intermediate the horizontal component 36 and the vertical component 38 of the beacon 30 in the beacon separator 34 is a discriminating reflector 42. The purpose of the discriminating reflector 42 is to allow the optical digitizer 10 to discriminate the horizontal component 36 from the vertical component 38. The discriminating reflector 42 directs a small portion of the beacon 30 back to the oscillating mirror 32. The manner in which the discriminating reflector 42 allows discrimination between the horizontal and vertical components 36,38 will become clear upon further description of the preferred embodiment below.

The horizontal component 36 of the beacon 30 next strikes a reflector 44 which directs the beacon 30 in a downward direction as viewed in FIG. 1. Thus, it can be seen that as the horizontal component 36 of the beacon 30 sweeps across the downwardly facing surface of reflector 44, it is made to sweep horizontally from side to side as viewed in FIG. 1. The uppermost limit of the horizontal component 36, illustrated as a beam 46 in the beacon separator 34, once reflected off of the reflector 44, becomes the leftmost limit of a horizontal beacon portion 48 as viewed in FIG. 1. The lowermost limit of the horizontal component 36, illustrated as a beam 50, once reflected off of the reflector 44, becomes the rightmost limit of the horizontal beacon portion 48 as viewed in FIG. 1. Therefore, the horizontal beacon portion 48, is nothing more than the horizontal component 36 of the beacon 30 reflected off of the reflector 44.

The reflector 44 in the illustrated preferred embodiment is constructed of a material which enhances the accuracy of the optical digitizer 10. The material, a reflective angle film (RAF) available from the 3M Corporation, reflects light at the same angle independent of the angle at which the light strikes its surface, within limits. In FIG. 1, it can be seen that beam 46 strikes the reflector 44 (constructed of the RAF material) at a slightly different angle than does beam 50, however, once reflected off of reflector 44, beams 46 and 50 are parallel in the horizontal beacon portion 48. It is to be understood that, in carrying out the principles of the present invention, the reflector 44 does not have to be made of the RAF material, and that beams 46 and 50 do not have to be parallel in the horizontal beacon portion 48.

In keeping with the principles of the present invention, the reflector 44 could have a curved shape instead of the linear shape representatively illustrated in FIG. 1. In that way, a beam passing over the surface of the reflector 44 could be reflected in a direction which depends upon the curvature of the reflector 44.

Vertical component 38 of the beacon 30, after leaving the mirror 40 in the beacon separator 34, strikes a reflector 52 which is made of the RAF material in the illustrated preferred embodiment. A beam 54, farthest to the right in the vertical component 38 as illustrated in FIG. 1, strikes the reflector 52 and is reflected to the right in a direction orthogonal to the horizontal beacon portion 48. A beam 56, farthest to the left in the vertical component 38, strikes the reflector 52 and is also directed to the right, orthogonal to horizontal beacon portion 48 as illustrated in FIG. 1. Thus, it can be seen that vertical component 38 of the beacon 30 is reflected off of reflector 52 so that it sweeps vertically, as illustrated in FIG. 1, between the representatively shown beams 54 and 56, forming a vertical beacon portion 58 which is orthogonal to horizontal beacon portion 48. Note that, as with reflector 44 described above, reflector 52 could have a curved shape and could be made of other materials without deviating from the principles of the present invention.

Since beam 14 is continuously directed to the oscillating mirror 32 in the beacon generator 28, the resulting beacon 30 is also continuous. Therefore, although beams 46 and 50 are illustrated as being at the outer limits of horizontal beacon portion 48, and beams 54 and 56 are illustrated as being at the outer limits of vertical beacon portion 58, it is important to understand that the beam 14, in the form of the vertical or horizontal beacon portion 48,58 sweeps continuously between these outer limits. Note, however, that at any one instant in the illustrated preferred embodiment, beam 14 may be directed to the horizontal beacon portion 48 or vertical beacon portion 58, but not both.

It is also important to note at this point that although separate beams 46,50,54,56 are referred to in this description of the illustrated preferred embodiment, no two of these are present at one time, since they all emanate from the same beam 14 produced by the light source 12. Beams 46,50,54, 56 representatively illustrated in FIG. 1 are all simply different positions of beam 14. Likewise, different beacon portions 48,58 and beacon components 36,38 are just parts of beacon 30, which is, in turn, made up of different positions of beam 14 produced by the oscillating mirror 32.

Beam 56 intersects beam 46 at point 60 and intersects beam 50 at point 62. Beam 54 intersects beam 46 at point 64 and intersects beam 50 at point 66. Since the horizontal beacon portion 48 is orthogonal to the vertical beacon portion 58, points 60, 62, 64, and 66 define the corners of a rectangular light grid 68. In this light grid 68, the horizontal beacon portion 48 sweeps from side to side, and the vertical beacon portion 58 sweeps from top to bottom, as representatively illustrated in FIG. 1. For the purpose of further description of the illustrated preferred embodiment, the defined beginning of the sweep of the horizontal beacon portion 48 shall be at its leftmost limit (beam 46 as illustrated in FIG. 1), and the defined beginning of the sweep of the vertical beacon portion 58 shall be at its upper limit (beam 56 as illustrated in FIG. 1).

It is to be understood that the light grid 68 could have a shape other than rectangular without deviating from the principles of the present invention. If, as described above, beams 46 and 50 are not parallel to each other, a trapezoid shape is produced. If, additionally, beams 56 and 54 are not parallel to each other, another polygonal shape is produced. Light grid 68 may take virtually any shape in keeping with the principles of the present invention as long as no beam in the horizontal beacon portion 48 is collinear with a beam in the vertical beacon portion 58.

Reflector 70, representatively illustrated in FIG. 1 as being horizontally disposed at the lowermost extent of horizontal beacon portion 48, reflects the horizontal beacon portion 48 directly back in the direction of reflector 44. Unfilled arrowheads on beams representatively illustrated in horizontal beacon portion 48 indicate the direction of beams which have reflected off of reflector 70. Thus, beams in the horizontal beacon portion 48 are reflected back to reflector 44, thence back through the beacon separator 34 to the oscillating mirror 32 in the beacon generator 28, and thence to the beam splitter 24.

In a similar manner, reflector 72, representatively illustrated in FIG. 1 as being vertically disposed at the right-hand edge of vertical beacon portion 58, reflects the vertical beacon portion 58 directly back in the direction of reflector 52. Unfilled arrowheads on beams representatively illustrated in vertical beacon portion 58 indicate the direction of beams which have reflected off of reflector 72. Thus, beams in the vertical beacon portion 58 are reflected back to reflector 52, thence back to the mirror 40 in the beacon separator 34, thence to the oscillating mirror 32 in the beacon generator 28, and thence to the beam splitter 24.

Reflectors 70 and 72, in the illustrated preferred embodiment, are made of a material which reflects light back in the same direction at which it initially strikes the material. It is known to those skilled in the art as retro-reflecting film. There are several types of retro-reflecting film, including micro corner cube and micro sphere. Applicants have found the micro corner cube type to give acceptable results in the illustrated preferred embodiment apparatus.

Figure 6A:
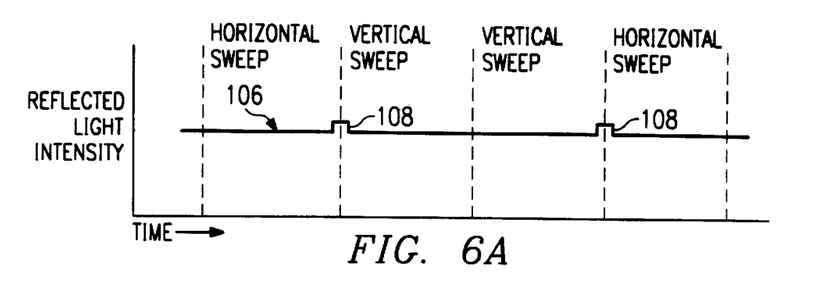
FIG. 6A is a plot of light reflected back to a light sensor of the optical digitizer when the light grid is totally unobstructed.

In the illustrated preferred embodiment, with no obstruction blocking the path of any beam, the cumulative total of the beams reflected back from the horizontal and vertical beacon portions 48,58 and the discriminating reflector 42 to the beam splitter 24 is continuous and equal to the beam 14 which leaves the beam splitter 24 to enter the beacon generator 28 (see FIG. 6A and accompanying description). It is to be understood, however, that as beam 14 is reflected off of various surfaces and passes through various components of the illustrated preferred embodiment, transmission errors and various inefficiencies in reflecting the beam 14 will result in a loss in light intensity by the time it is reflected back to the beam splitter 24.

Discriminating reflector 42 in the beacon separator 34 takes advantage of the above-mentioned loss in light intensity by reflecting a small portion of the beacon 30 back to the beam splitter 24 before it reflects off of any of the other reflecting surfaces 40,44,52,70,72. This produces a momentary increase in light intensity reflected back to the beam splitter 24 to aid in discriminating between the horizontal and vertical components 36,38 of the beacon 30 reflected back to the beam splitter 24. Other methods of discrimination may be utilized without deviating from the principles of the present invention. For example, a nonreflective surface could be provided in place of discriminating reflector 42, which would produce an absence of reflected light between the horizontal and vertical components 36,38 reflected back to the beam splitter 24. Alternatively, a series of coded nonreflecting lines could be positioned near the ends of the reflectors 70,72, the code telling the computer that a horizontal and/or vertical sweep has ended and/or begun. Yet another method of telling a horizontal from a vertical sweep would be to provide an encoder on the oscillating mirror 32 so that the mirror's position and, therefore, the direction of the beam 14 is communicated to the computer.

The reflected beam 14, representatively illustrated in FIG. 1 having an unfilled arrowhead, enters the beam splitter 24 and strikes the half-silvered mirror 26. A portion of the reflected beam 14 is directed to a light sensor 74. A photodiode 76 in the path of the reflected beam 14 is capable of measuring the beam's intensity. The photodiode 76 has leads 78 for connecting to measurement electronics (not shown). Other methods of measuring the beam's intensity may be used without deviating from the principles of the present invention. Use of the preferred embodiment apparatus illustrated in FIG. 1, and the resulting measurements of the intensity of the reflected beam 14 over time, allow the position of an object in the light grid 68 to be determined.

Figure 2:
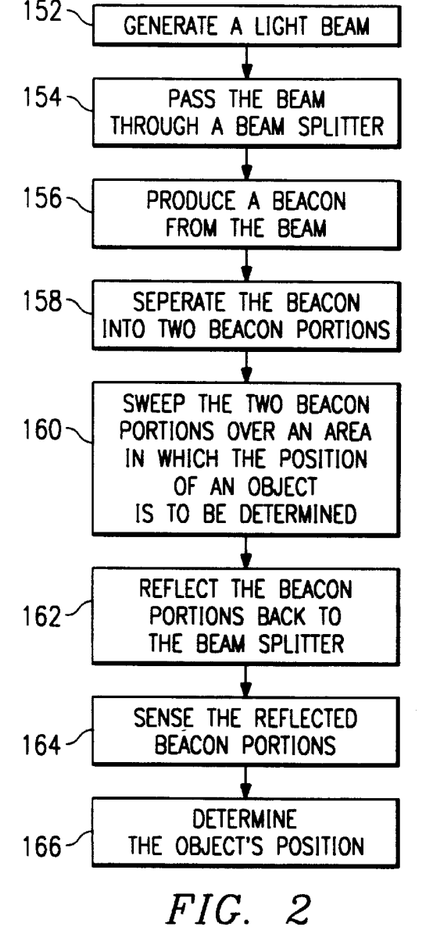
FIG. 2 is a flow chart illustrating a method of determining an object's position embodying principles of the present invention.

Turning now to FIG. 2, a preferred embodiment of a method 150 of determining an object's position in accordance with the principles of the present invention is representatively illustrated. The preferred method embodiment is for determining the object's position on a two-dimensional plane, although other embodiments of the present invention may be used to determine the object's position in one or three dimensions, the object's velocity or acceleration, etc.

Commencing with step 152, a light beam is generated. Preferably, the light beam is compact and is composed of light rays which are essentially parallel to each other. The more compact the light beam, the greater the resolution capability, and the more the light rays are parallel to each other, the greater the accuracy of the preferred embodiment method 150.

Through testing, applicants have found that a conventional light emitting diode-type infrared laser having an integral collimator produces a suitable light beam for use with the preferred embodiment method 150. Other suitable light beam producers are commercially available, for example, a laser of the type typically used in compact disk drives. It is not necessary that the light beam produced be in the infrared range of the light spectrum.

Continuing with step 154, the beam is passed through a beam splitter. The purpose of the beam splitter in the preferred embodiment method 150 is to separate the light which is later reflected back to the beam splitter from the light beam produced in step 152. The preferred embodiment method 150 utilizes a halfsilvered mirror which passes fifty percent of the light beam, and reflects fifty percent of the light beam. Other beam splitter configurations suitable for use with the preferred embodiment method 150 are commercially available, such as a dual prism having a partially-reflective film between the prisms.

In the preferred embodiment method 150, the fifty percent of the light beam produced in step 152 which is reflected by the beam splitter is not utilized. It is to be understood, however, that this reflected fifty percent of the light beam could be utilized to, for example, produce a beacon as described hereinbelow for use in determining an object's position, without deviating from the principles of the present invention.

Continuing with step 156, a beacon is produced from the unreflected fifty percent of the light beam which is passed through the beam splitter. In the preferred embodiment method 150, an oscillating mirror is used to reflect the beam back and forth repeatedly, thereby producing the beacon. The oscillating mirror is also used later in the preferred embodiment method 150 to reflect the beacon produced in this step back to the beam splitter.

Other beacon producing means are suitable for use in the preferred embodiment method 150, for example, a rotating polygonal mirror. In some respects, a rotating mirror has advantages over the oscillating mirror. For example, a rotating mirror produces a beacon which sweeps over an area repeatedly in only one direction, instead of back and forth, making it somewhat less complex to later differentiate between the forward and backward sweeps. Another advantage of a rotating mirror is that it typically produces a linear sweep rate, that is, the beam is made to sweep over an area with a relatively constant angular velocity, making it somewhat less complex to later compute the relationship between the beam's position and time In comparison, the oscillating mirror typically produces a sinusoidal sweep rate. Applicants, however, have chosen to use the oscillating mirror in the preferred embodiment method 150 because it has less bulk and fewer moving parts than a typical rotating mirror.

Continuing with step 158, the beacon produced in step 156 is separated into two beacon portions. Each of the beacon portions so separated is used later to determine the object's position in one dimension. Therefore, two beacon portions are needed in the preferred embodiment method 150, since the object's position is to be determined in two dimensions.

In the preferred embodiment method 150, applicants utilize a beacon separator in step 158 which has a reflective surface partially extending into the area swept by the beacon produced in step 156. The reflective surface diverts a portion of the beacon so that it may, separately from the undiverted portion of the beacon, be swept across the two-dimensional plane in which the object's position is to be determined. Other means of separating the beacon into multiple portions, for example a prism, may be utilized without deviating from the principles of the present invention.

Continuing with step 160, the two beacon portions separated in step 158 are swept over an area in which the position of the object is to be determined. In the preferred embodiment method 150, the area is the two-dimensional plane discussed above. Preferably, the two beacon portions are swept over the area such that the beacon portions are orthogonal to each other. In this manner, later computations of the object's position are somewhat less complex. It is to be understood, however, that it is not necessary, in keeping with the principles of the present invention, for the beacon portions to be orthogonal to each other when being swept over the area in which the position of the object is to be determined.

To direct the beacon portions over the two-dimensional plane such that they are orthogonal to each other, applicants reflect each beacon portion off of a reflective surface having the property that the reflected beacon portion leaves the reflective surface at a relatively constant angle regardless the angle at which the beacon portion strikes the reflective surface. Thus, the angle of one beacon portion leaving one reflective surface may be positioned so that it is orthogonal to the other beacon portion leaving the other reflective surface.

Other means may be utilized to direct the beacon portions orthogonally over the two-dimensional plane without deviating from the principles of the present invention. For example, each beacon portion could be reflected off of a curved reflector having a curvature such that the beacon portion would be reflected in the same direction no matter where the beacon portion strikes the curved reflector.

Continuing with step 162, after being-swept over the area in which the position of the object is to be determined, the beacon portions are reflected back to the beam splitter. The object, being positioned in the two-dimensional plane swept by the beacon portions, obstructs a fragment of each beacon portion, thus preventing its reflection back to the beam splitter.

For reflecting each beacon portion back to the beam splitter, applicants utilize a reflective surface having the property that it reflects light back in the same direction at which the light strikes the reflective surface. Other means, such as a mirror, may be utilized for reflecting each beacon portion back to the beam splitter without deviating from the principles of the present invention.

Note that, in this step 162 of the preferred embodiment method 150, the beacon portions are reflected back off of each reflective surface in a direction opposite to that which they had reflected off those reflective surfaces in the previous steps, namely, the reflective surfaces utilized by applicants to orient the beacon portions orthogonally described in step 160 above, the reflective surface utilized by applicants in the beacon separator described in step 158 above (only the beacon portion diverted in step 158), and the oscillating mirror utilized by applicants for producing the beacon as described in step 156 above.

Continuing with step 164, the beacon portions reflected back to the beam splitter in step 162 are directed to a light sensor. The light sensor measures the intensity of the beacon portions reflected back to the beam splitter.

Applicants utilize a photodiode suitable for measuring the intensity of infrared light to measure the intensity of the beacon portions reflected back to the beam splitter. Other light sensors may be used without deviating from the principles of the present invention. It is to be understood, however, that the light sensor must be capable of measuring the intensity of the light produced in step 152 and must be capable of detecting the unreflected fragments of the beacon portions, described above in regard to step 162.

Continuing with step 166, the object's position in the two-dimensional plane is determined. In the preferred embodiment method 150, the unreflected fragments of the beacon portions, detected in step 164 above, indicate the position of the object, since the object caused those fragments to not be reflected back to the beam splitter in step 162 above.

One unreflected fragment will be present in each beacon portion reflected back to the beam splitter in the preferred embodiment method 150. By computing the position of the unreflected fragment in each beacon portion, the position of the object in each of two dimensions can be determined.

Applicants utilize a microprocessor to time the unreflected fragment in each beacon portion and compute the object's position, based on the sinusoidal sweep rate of the oscillating mirror. Since, in the preferred embodiment method 150, the beacon portions are orthogonal to each other, the object's position can be directly computed in cartesian coordinates in the two-dimensional plane. If, however, the beacon portions are not orthogonal to each other, the object's cartesian coordinates can still be computed, albeit using more complex calculations, without deviating from the principles of the present invention.

Figure 3:
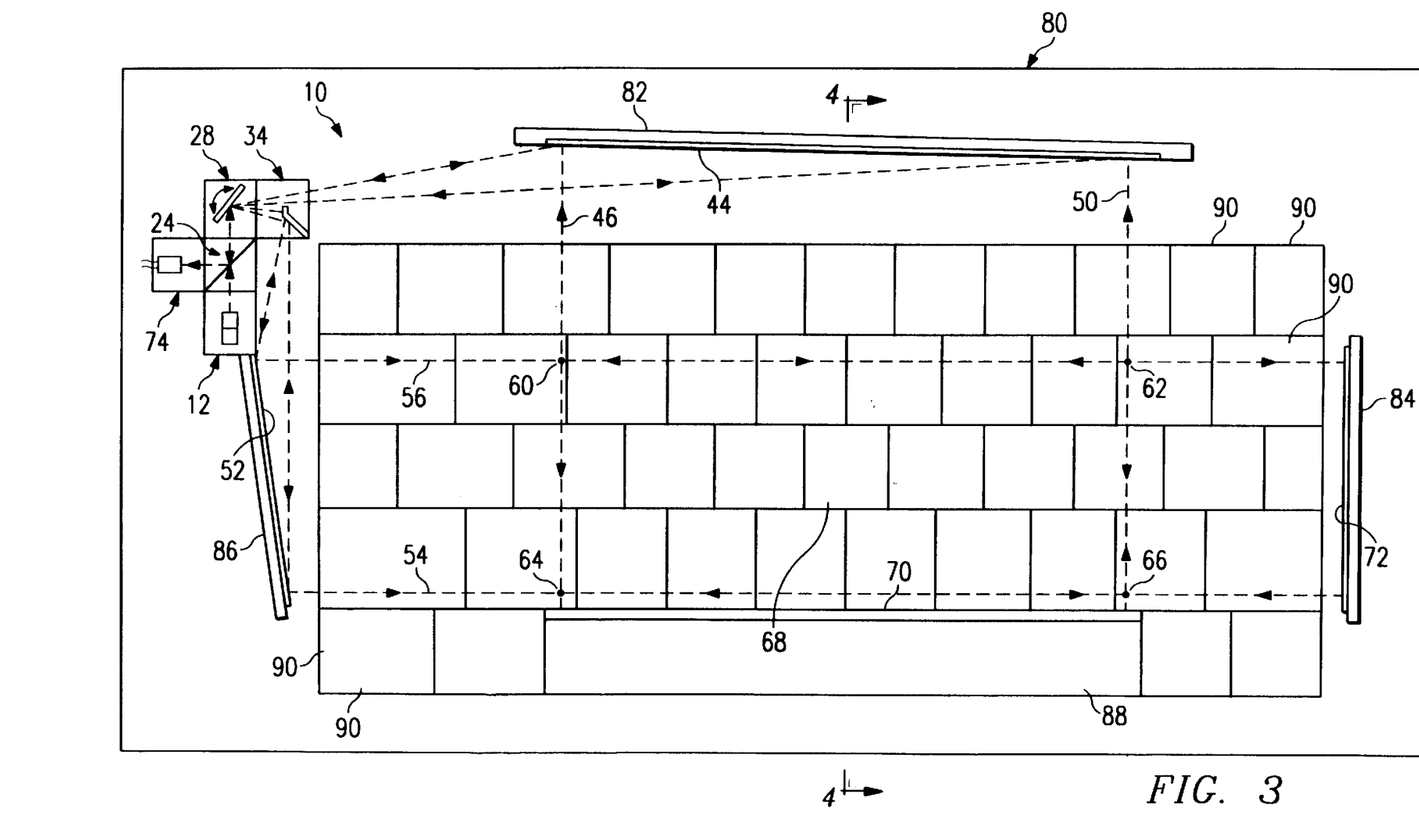
FIG. 3 is a top plan view of a computer keyboard having the optical digitizer of FIG. 1 thereon.

Turning now to FIG. 3, the optical digitizer 10 is representatively illustrated as being disposed on the computer keyboard 80 having keys 90. The keyboard 80 is otherwise conventional, suited for input of text by typing on keys 90, and is typically used in conjunction with a computer.

As representatively illustrated in FIG. 3, the top surface of the keyboard 80 having the keys 90 thereon is in a vertical orientation, with the side which typically faces the user being at the bottom of the illustration. It is to be understood that, in the following description, the use of the terms "vertical" and "horizontal" refer to the representatively illustrated orientation of the keyboard 80 in FIG. 3. Stated in another manner, the "vertical" direction runs up and down, and the "horizontal" direction runs side to side in FIG. 3.

Light source 12, beam splitter 24, beacon generator 28, beacon separator 34, and light sensor 74 (combinatively forming the previously described optical digitizer 10) are shown in schematicized form, conveniently mounted near the upper left-hand portion of the keyboard 80, although other positionings of these elements are possible without deviating from the principles of the present invention.

Reflector 44 is mounted on a support 82 to the rear of the keys 90. Reflector 72 is mounted on a support 84 to the right of the keys 90. Reflector 52 is mounted on a support 86 to the left of the keys 90. Reflector 70 is mounted on an upwardly extending and rearwardly facing portion of a space bar 88.

Points 60,62,64,66 form the corners of the rectangular light grid 68. At the light grid's horizontal extremities are beams 46 and 50. At the light grid's vertical extremities are beams 54 and 56. Thus, in the illustrated preferred embodiment, the light grid 68 is positioned over a portion of the keys 90. In keeping with the principles of the present invention, the light grid 68 may be enlarged or reduced to any convenient size or shape and may overlay all, a portion of, or none of the keys 90.

Figure 4:
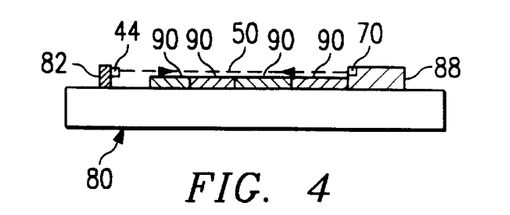
FIG. 4 is a cross-sectional view through the keyboard, taken along line 4—4 of FIG. 3.

Illustrated in FIG. 4 is a cross-sectional view taken along line 4—4 through the keyboard 80 illustrated in FIG. 3. In this view, the spacing between the keys 90 and the beam 50 can be seen. Reflectors 44 and 70 are positioned just above the keys 90, reflector 44 being mounted to support 82, and reflector 70 being mounted to the space bar 88.

Positioning the optical digitizer 10 in this manner allows a computer user to operate the digitizer 10 without removing the user's hands from the keyboard 80. The user can conveniently lift the fingers slightly above the keyboard 80, activate the optical digitizer 10 by, for example, pressing an appropriate control or function key on the keyboard, and then use one finger to obstruct the light grid 68 and thereby communicate positional information, select a screen object, etc. When the user is finished using the digitizer 10, it is deactivated by, for example, pressing another control or function key, and the user may type on the keys 90 again. This is all accomplished without the user's hands leaving their normal positions above the keyboard 80. Alternately, suitably configured firmware could be provided to activate or deactivate the digitizer 10. For example, the firmware could be configured to assume that the user wishes to switch from the positional mode into the typing mode upon the detection of multiple finger obstructions by the digitizer 10. Coversely, the firmware could assume that the user wishes to switch from the typing mode into the positional mode upon the detection of a single finger obstruction without a subsequent detection of a key stroke within a preselected time period.

In an alternate embodiment of the invention not shown in the drawings, a generally flat adapter plate may be provided in place of the keys 90 of the computer keyboard and a restraining plate positioned along the edges of the computer keyboard 80. In this manner, a defined drawing area suitable for use with a stylus or other pen computing instrument in which the restraining plate would limit the movement of the stylus to within the defined drawing area would be provided.

In another alternate embodiment of the invention, also not illustrated in the drawings, the keyboard 80 could be configured as a "virtual" keyboard without keys 90 and, in their place, a generally smooth surface having a graphical illustration of the keys 90.

Figure 5:
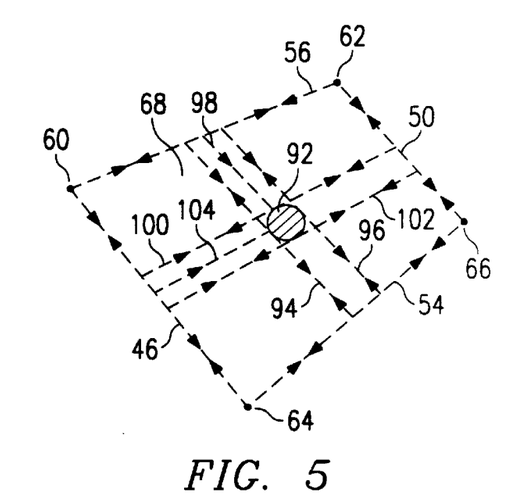
FIG. 5 is an isometric view of a light grid produced by the optical digitizer illustrating obstructed and unobstructed portions of the light grid.

FIG. 5 shows how the location of an obstruction 92 in the light grid 68 is determined. As in the above described figures, filled arrowheads indicate the direction of light beams which have not been reflected off of reflector 70 or 72, while blank arrowheads indicate the direction of beams which have been reflected off of reflector 70 or 72. Note that in FIG. 5, beams 56,50,54, and 46, and points 60,62,64, and 66 correspond to the same beams and points in FIGS. 1,3, and 4.

Beams 46 and 50, at the outer limits of the horizontal beacon portion 48 are seen to be reflected off of reflector 70. They will be detected, as described above, by the light sensor 74. Likewise, beams 94 and 96, passing just to each side of the obstruction 92 are also reflected back to the light sensor 74. However, beam 98, which strikes the obstruction 92 is not reflected back and, therefore, cannot be detected by the light sensor 74. Note that each of beams 46,50,94,96, and 98 are part of the horizontal beacon portion 48. Thus, the absence of a beam being reflected back from the horizontal beacon portion 48 is detected by the light sensor 74. The center of the horizontal position of the obstruction 92 can be determined by averaging the horizontal positions of beams 94 and 96 which pass just to each side of the obstruction 92.

The vertical portion of the grid 68 operates in the same manner as the horizontal portion. Beams 54 and 56, at the outer limits of the vertical beacon portion 58 are seen to be reflected off of reflector 72. They will be detected, as described above, by the light sensor 74. Likewise, beams 100 and 102, passing just to each side of the obstruction 92 are also reflected back to the light sensor 74. However, beam 104, which strikes the obstruction 92 is not reflected back and, therefore, cannot be detected by the light sensor 74. Note that each of beams 54,56,100,102, and 104 are part of the vertical beacon portion 58. Thus, the absence of a beam being reflected back from the vertical beacon portion 58 is detected by the light sensor 74. The center of the vertical position of the obstruction 92 can be determined by averaging the vertical positions of beams 100 and 102 which pass just to each side of the obstruction 92.

FIGS. 6A through 6E representatively illustrate how the light sensor 74 receives and measures the intensity of the reflected beam 14. The vertical scale in each of FIGS. 6A through 6E is reflected light intensity which the photodiode 76, through leads 78, communicates to the computer. The horizontal scale is time. Traces on these graphs thus indicate a "snapshot" in time of the reflected light intensity "seen" by the light sensor 74.

FIG. 6A representatively illustrates what the light sensor 74 sees when there is no obstruction in the light grid 68. Trace 106 is completely flat (with the exception of small increases in intensity 108 between horizontal and vertical sweeps of the beacon 30), indicating that all of the beam 14 from the horizontal and vertical beacon portions 48,58 is being reflected back off of reflectors 70 and 72.

The small increases in intensity 108 between the horizontal and vertical sweeps are due to the portion of the beacon 30 reflected back to the light sensor 74 by the discriminating reflector 42 in the beacon separator 34. In this manner, the computer can discriminate between a vertical and a horizontal sweep. If, as described above, a nonreflective surface is used to discriminate between horizontal and vertical sweeps of the beacon 30, a decrease, instead of an increase 108, in light intensity would be seen by the light sensor 74.

Note that in FIG. 6A a vertical sweep of the beacon 30 is followed by another vertical sweep and a horizontal sweep is followed by another horizontal sweep. This is due to the fact that the mirror 32 is oscillating. Each sweep is immediately repeated in reverse as the mirror 32 oscillates back and forth. If a rotating polygonal mirror is used instead of an oscillating mirror, a vertical sweep will be followed by a horizontal sweep and a horizontal sweep will be followed by a vertical sweep.

Figure 6B:
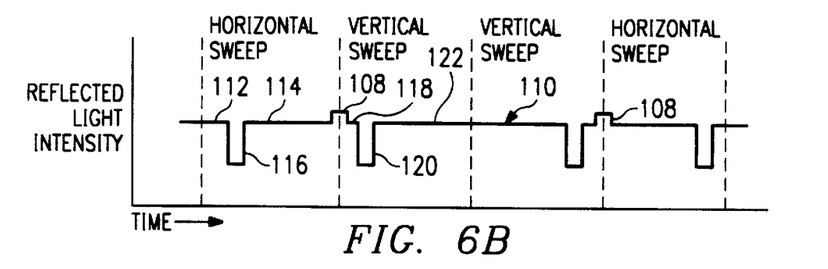
FIG. 6B is a plot of the light reflected when the light grid is obstructed by an object in a first position.

FIG. 6B representatively illustrates a trace 110 produced when there is an obstruction 92 in the light grid 68 near the beginning of both horizontal and vertical sweeps. Referring to FIG. 5, the obstruction 92 would be located near point 60, but still within the light grid 68.

At the beginning of the horizontal sweep, the light intensity represented by trace 110 is the same as trace 106 in the previous FIG. 6A. As the horizontal beacon portion 48 is reflected back to the light sensor 74, between beams 46 and 94, the reflected light intensity remains the same (portion 112 of trace 110). Where the horizontal beacon portion 48 is not reflected back to the light sensor 7.4, such as beam 98 between beams 94 and 96, the reflected light intensity drops (portion 116,of trace 110). Between beams 96 and 50, when the horizontal beacon portion 48 is again reflected back to the light sensor 74, the reflected light intensity returns to its initial level (portion 114 of trace 110). An increase in light intensity 108 indicates the beginning of the vertical sweep.

As with the horizontal sweep described above, at the beginning of the vertical sweep, the light intensity represented by trace 110 is the same as trace 106. As the vertical beacon portion 58 is reflected back to the light sensor 74, between beams 56 and 100, the reflected light intensity remains the same (portion 118 of trace 110). Where the vertical beacon portion 58 is not reflected back to the light sensor 74, such as beam 104 between beams 100 and 102, the reflected light intensity drops (portion 120 of trace 110). Between beams 102 and 54, when the vertical beacon portion 58 is again reflected back to the light sensor 74, the reflected light intensity returns to its initial level (portion 122 of trace 110). The remainder of trace 110 is the reverse of that described immediately above as the mirror 32 oscillates back to its initial position to begin another sweep of the beacon 30.

Thus, it is seen that a drop in reflected light intensity is seen by the light sensor 74 when an obstruction 92 is encountered in the horizontal and vertical sweeps. The center of the obstruction's position may be calculated by measuring the time from the beginning of the horizontal and vertical sweeps to the centers of the drops in reflected light intensity (portions 116 and 120 of trace 110). The times thus measured correspond to the horizontal and vertical positions of the obstruction 92 in the light grid 68.

The relationship between time and horizontal and vertical position within the light grid 68 will vary, depending on many factors. If, for example, the position of the oscillating mirror 32 varies according to a sinusoidal function, the relationship between time and horizontal and vertical position within the light grid 68 will also be a nonlinear function. If the beams which make up the horizontal or vertical beacon portion 48,58 are not parallel to each other, or if the beacon portions are not orthogonal to each other, the relationship between time and position will be affected accordingly.

Figure 6C:
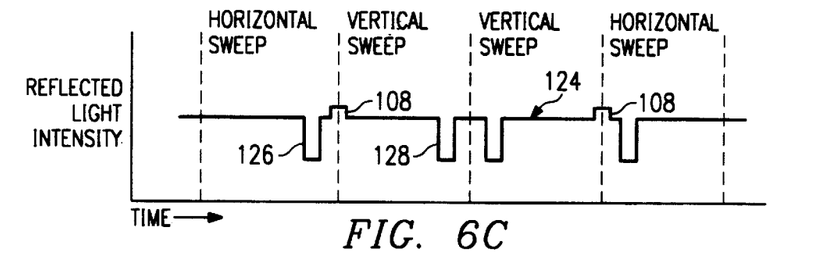
FIG. 6C is a plot of the light reflected when the light grid is obstructed by an object in a second position.

FIG. 6C is similar to FIG. 6B, except that the representatively illustrated portions of a trace 124 indicating a reduced reflected light intensity 126,128 are near the end of the horizontal and vertical sweeps, respectively. Referring to FIG. 5, the trace 124 corresponds to a position of the obstruction 92 near point 66, but still within the light grid 68. Note that, with the obstruction 92 in that position, the unreflected beam 98 in the horizontal beacon portion 48 would be near the end of the horizontal sweep, corresponding to portion 126 of trace 124, and that the unreflected beam 104 in the vertical beacon portion 58 would be near the end of the vertical sweep, corresponding to portion 128 of trace 124.

Figure 6D:
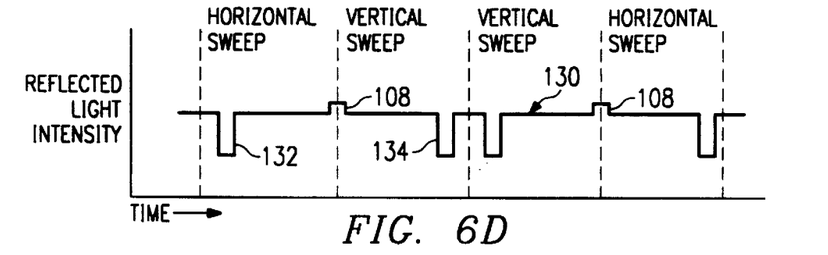
FIG. 6D is a plot of the light reflected when the light grid is obstructed by an object in a third position.

Representatively illustrated in FIG. 6D are portions of a trace 130 having reduced reflected light intensity 132,134 near the beginning of the horizontal sweep and near the end of the vertical sweep of the beacon 30. This corresponds to a position of the obstruction 92 near point 64, but still within the light grid 68 (see FIG. 5).

Figure 6E:
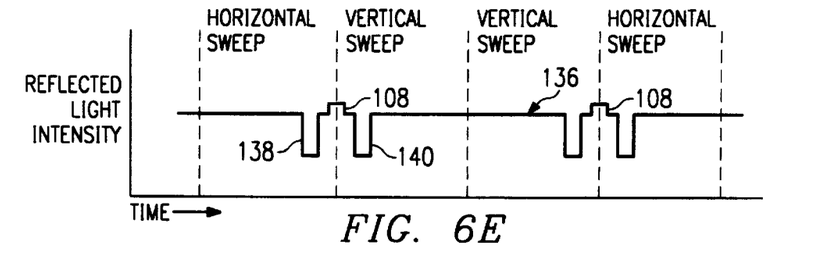
FIG. 6E is a plot of the light reflected when the light grid is obstructed by an object in a fourth position.

Representatively illustrated in FIG. 6E are portions of a trace 136 having reduced reflected light intensity 138,140 near the end of the horizontal sweep and near the beginning of the vertical sweep of the beacon 30. This corresponds to a position of the obstruction 92 near point 62, but still within the light grid 68 (see FIG. 5).

Thus, a person of ordinary skill in the art, given the characteristics of the optical digitizer 10 and the reflected light intensity detected over time by the light sensor 74, is able to determine the position of an obstruction 92 anywhere within the light grid 68.

Up to this point, the optical digitizer 10 has been described without regard to the relationship between a plane across which the horizontal beacon portion 48 is swept and a plane across which the vertical beacon 58 portion is swept. FIGS. 1,3, and 5 illustrate preferred embodiments in which the above described planes are coplanar. If, however, the planes are not coplanar, the optical digitizer 10 functions as described hereinabove, but the obstruction 92 is then permitted to obstruct one of the beacon portions 48,58 without obstructing the other. It is then possible to perform other functions, for example, measure the velocity of the obstruction 92 by dividing the distance separating the planes swept by the horizontal and vertical beacon portions 48,58 by the difference in time between when the light sensor 74 sees a reduced reflected light intensity in each sweep.

It is also possible to determine the position of an obstruction in more or less than two dimensions using the principles of the present invention. If only one spatial dimension is desired, then only one beacon portion is needed. If three spatial dimensions are desired, more than one optical digitizer 10 may be stacked to form a three-dimensional light grid.

The foregoing detailed description is to be clearly understood as being given by way of illustration and example only, the spirit and scope of the present invention being limited solely by the appended claims.

What is claimed is:

1. A user input subsystem, comprising:
    a single light source, and a beacon generator which is optically coupled to said light source to generate an oscillating beacon therefrom;
    an optical train, including a beacon separator which diverts at least a portion of said beacon to thereby separates light from said light source into first and second oscillating beacons, and additional elements which direct said first and second beacons through different axes of a light grid;
    one or more retroreflectors which retroreflect said first and second beacons; and
    a sensor which senses retroreflected portions of said first and second beacons;
    whereby the output of said sensor provides information about the instantaneous position of an obstruction, such as a fingertip, which may be positioned within said light grid.

2. The subsystem of claim 1, wherein said optical train includes reflectors made of a reflective angle film.

3. The subsystem of claim 1, wherein said retroreflectors are made of a micro corner cube film.

4. The subsystem of claim 1, wherein light from said light source passes through a beam splitter, and said sensor is optically coupled to said retroreflectors through said beam splitter.

5. The subsystem of claim 1, wherein said light source is a diode laser.

6. A user input subsystem, comprising:
    a keyboard;

a single light source, and a beacon generator which is optically coupled to said light source to generate an oscillating beacon therefrom;

an optical train, including a beacon separator which diverts at least a portion of said beacon to thereby separates light from said light source into first and second oscillating beacons, and additional elements which direct said first and second beacons through different axes of a light grid which is positioned above said keyboard;

one or more retroreflectors which retroreflect said first and second beacons; and a sensor which senses retroreflected portions of said first and second beacons;

wherein said sensor and the keyboard are both connected to provide output signals indicating user inputs.

7. The subsystem of claim 6, wherein said optical train includes reflectors made of a reflective angle film.

8. The subsystem of claim 6, wherein said retroreflectors are made of a micro corner cube film.

9. The subsystem of claim 6, wherein light from said light source passes through a beam splitter, and said sensor is optically coupled to said retroreflectors through said beam splitter.

10. The subsystem of claim 6, wherein said light source is a diode laser.

11. A user input subsystem, comprising:

a single light source positioned to emit a collimated light beam;

a beacon generator which generates an oscillating beacon from said light beam;

a beacon separator which diverts a portion of said oscillating beacon to thereby separate said oscillating beacon into first and second beacon components;

an optical train which directs said first and second beacon portions through different axes of a light grid;

two retroreflectors which retroreflect said first and second beacon portions; and a sensor which senses retroreflected portions of said first and second beacons;

whereby the output of said sensor provides information about the instantaneous position of an obstruction, such as a fingertip, which may be positioned within said light grid.

12. The subsystem of claim 11, wherein said optical train includes reflectors made of a reflective angle film.

13. The subsystem of claim 11, wherein said retroreflectors are made of a micro corner cube film.

14. The subsystem of claim 11, wherein light from said light source passes through a beam splitter, and said sensor is optically coupled to said retroreflectors through said beam splitter.

15. The subsystem of claim 11, wherein said light source is a diode laser.

16. The subsystem of claim 1, wherein said beacon separator also reflects a portion of said oscillating beacon back toward said sensor, without passage through said grid.

17. The subsystem of claim 6, wherein said beacon separator also reflects a portion of said oscillating beacon back toward said sensor, without passage through said grid.

18. The subsystem of claim 11, wherein said beacon separator also reflects a portion of said oscillating beacon back toward said sensor, without passage through said grid.

* * * * *